US009075597B2

(12) United States Patent
Klemenz

(10) Patent No.: US 9,075,597 B2
(45) Date of Patent: Jul. 7, 2015

(54) MODELED COMMUNICATION BETWEEN DEPLOYMENT UNITS

(75) Inventor: Oliver Klemenz, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/194,263

(22) Filed: Jul. 29, 2011

(65) Prior Publication Data

US 2013/0031127 A1 Jan. 31, 2013

(51) Int. Cl.
*G06F 17/30* (2006.01)
*G06F 9/44* (2006.01)
*G06Q 10/10* (2012.01)

(52) U.S. Cl.
CPC . *G06F 8/30* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 7,996,488 | B1 * | 8/2011 | Casabella et al. | 709/217 |
| 8,095,497 | B2 * | 1/2012 | O'Brien et al. | 707/769 |
| 2004/0186860 | A1 * | 9/2004 | Lee et al. | 707/200 |
| 2006/0212593 | A1 * | 9/2006 | Patrick et al. | 709/230 |
| 2007/0156804 | A1 * | 7/2007 | Mo | 709/200 |
| 2009/0193057 | A1 * | 7/2009 | Maes | 707/200 |
| 2010/0292810 | A1 * | 11/2010 | Colombo et al. | 700/29 |
| 2011/0145278 | A1 * | 6/2011 | Maes | 707/769 |
| 2011/0191383 | A1 * | 8/2011 | Addala et al. | 707/797 |
| 2011/0196824 | A1 * | 8/2011 | Maes | 707/610 |
| 2011/0270817 | A1 * | 11/2011 | Dettinger et al. | 707/706 |
| 2011/0307409 | A1 * | 12/2011 | Schiff et al. | 705/342 |
| 2012/0054174 | A1 * | 3/2012 | Gagnier et al. | 707/714 |
| 2013/0111487 | A1 * | 5/2013 | Cheyer et al. | 718/102 |

FOREIGN PATENT DOCUMENTS

EP 2093977 A1 * 8/2009

OTHER PUBLICATIONS

Peltz, Web Services Orchestration and Choreography, IEEE Computer Society, vol. 36, Issue 10, pp. 46-52, Oct. 2003, Retrieved from the Internet Nov. 13, 2012 at <URL: http://ieeexplore.ieee.org/xpls/abs_all.jsp?arnumber=1236471&tag=1>.*

(Continued)

*Primary Examiner* — Neveen Abel Jalil
*Assistant Examiner* — Tyler Torgrimson
(74) *Attorney, Agent, or Firm* — Buckley, Maschoff & Talwalkar LLC

(57) ABSTRACT

A computer-implemented system may include reception of a selection of a first business object, reception of a selection of a second business object, reception of a selection of one or more node elements of the second business object, reception of one or more query parameters, reception of a mapping to map a respective node element of the first business object to each of the selected one or more node elements of the second business object and to each of the one or more query parameters, reception of a script for evaluating a condition associated with the first business object, generation of runtime objects based on the mapping and the script, and execution of a runtime framework to use the runtime objects to evaluate the condition and to create a message mapping the respective node element of the first business object to each of the selected one or more node elements of the second business object and to each of the one or more query parameters.

12 Claims, 19 Drawing Sheets

(56) References Cited

OTHER PUBLICATIONS

Guinard et al., Interacting with the SOA-Based Internet of Things: Discovery, Query, Selection, and On-Demand Provisioning of Web Services, IEEE Transactions on Services Computing, vol. 3, No. 3, Jul.-Sep. 2010, pp. 223-235, Retrieved from the Internet on Nov. 13, 2012 at <URL: http://ieeexplore.ieee.org/xpls/abs_all.jsp?arnumber=5416674>.*

Ben-Natan et al., Web Services Orchestration, SOA World Magazine, SOA & WOA,.Sep. 23, 2002, Retrieved from the Internet on Nov. 13, 2012 at <URL: http://soa.sys-con.com/node/39573>.*

* cited by examiner

300 ↘

```
import AP.Common.GDT;

businessobject PDIBonusEntitlement {

[AlternativeKey]
    element ID : BusinessTransactionDocumentID;
    // MC1723
    element EmployeeID : EmployeeID;
    // 00300571C7CC02DBBCAE61032207416C
    element EmployeeUUID : UUID;
    // MC1723/001
    element WorkAgreementID : WorkAgreementID;
    // 00300571C7CC02DBBCAE610B122201A2
    element WorkAgreementUUID : UUID;
    // MONATSLOHN or GEHALTAT
    element CompensationComponentID : CompensationComponentTypeID;
    element ValidityPeriod : CLOSED_DatePeriod;
    element Amount : LARGE_Amount;
    element ActiveIndicator : Indicator;
}
```

○ Service Integration Wizard ☒

Internal Communication (A2A) – Interaction Message Structure and Identification (4/6)
Define the message structure and the identification attributes for the consuming actor.

┌ Consuming Actor ─────────────────────────────────────────────────────┐
│ Business Object: [Employee Compensation Agreement]   Node: [Item]      │
└──────────────────────────────────────────────────────────────────────┘
┌ Interaction Message ─────────────────────────────────────────────────┐
│ Name:     [Maintain]                                                  │
│ Structure:                                           [Collapse All]   │
│  ⊟ Item                                                               │
│    ├ ▢ UUID: UUID                                                     │
│    ├ ▢ Employment UUID: UUID                                          │
│    ├ ▢ Work Agreement UUID: UUID                                      │
│    ⊟ ItemCompensationComponent                                        │
│      ├ ▢ UUID: UUID                                                   │
│      ├ ▢ CompensationComponent Type UUID: UUID                        │
│      ├ ☑ CompensationComponent TypeID: CompensationComponent TypeID   │
│      ⊟ ItemCompensationComponentDetail                                │
│        ├ ▢ UUID: UUID                                                 │
│        ├ ☑ Validity Period: CLOSED_DatePeriod                         │
│        ├ ▢ ActiveIndicator: Indicator                                 │
│        ├ ▢ CompensationComponentPercent: MEDIUM_Percent               │
│        ├ ▢ CompensationComponentPercentCalenedarDayRecurrence: CalendarDayRecurrence │
│        ├ ▢ EmployeeBankDetailsKey: BusinessPartnerBankDetailsKey      │
│        ├ ▢ NoteToPayeeeNote: MEDIUM_Note                              │
│        │  ▢ UnitAmountCompensationComponentTypeUUID: UUID             │
│        ├ ▢ UnitAmount: LARGE_Amount                                   │
│        ⊟ ItemCompensationComponentDetailRate                          │
│          ├ ▢ UUID: UUID                                               │
│          ├ ▢ Validity Period: CLOSED_DatePeriod                       │
│          ├ ▢ PayrollRelevanceIndicator: Indicator                     │
│          ├ ☑ CompensationComponentAmount: LARGE_Amount                │
│          └ ▢ CompensationComponentPercentRecurrenceFrequencyCode: COMPENSATIONCOMPONENT_RecurringFrequency │
└──────────────────────────────────────────────────────────────────────┘
Formatted ID: [                                                      ▼]

┌ Instance Identification ─────────────────────────────────────────────┐
│ ○ Alternative Key: [                                              ▼] │
│ ⦿ Query:           [QueryByElements                                ▼] │
│   Query Mapping:  ┌──────────────────────────────┬─────────────────┐ │
│                   │ Query Parameter              │ Message Field   │ │
│                   ├──────────────────────────────┼─────────────────┤ │
│                   │ Employee ID                  │                 │ │
│                   ├──────────────────────────────┼─────────────────┤ │
│                 ▸ │ WorkAgreementCurrentlyActiveIndicator │         │ │
│                   ├──────────────────────────────┼─────────────────┤ │
│                 * │                              │                 │ │
│                   └──────────────────────────────┴─────────────────┘ │
│                                                    [Propose Mapping] │
├ Subnode Identification ──────────────────────────────────────────────┤
│ Node: [ItemCompensationComponentDetailRate                         ▼]│
│  ┌────────────────────────────────────────────────────────────────┐ │
│  │ ▢ CompensationComponentAmount                                   │ │
│  │ ▢ CompensationComponentAmount/currencyCode                      │ │
│  │ ▢ CompensationComponentAmount/content                           │ │
│  └────────────────────────────────────────────────────────────────┘ │
└──────────────────────────────────────────────────────────────────────┘

[< Back]  [Next >]  [Finish]  [Cancel]

FIG. 9

MODELED COMMUNICATION BETWEEN DEPLOYMENT UNITS

FIELD

Some embodiments relate to an application platform providing functionality based on business objects. More specifically, some embodiments relate to systems to communicate between business objects within an application platform.

BACKGROUND

An application platform may implement business objects to support different business solutions. A business object, for example, is a software model of business logic and/or data representing real-world items used during the transaction of business, such as a SalesOrder or an Organization. An instance of a business object may represent specific data (e.g., SalesOrder 4711, ACME corporation). A business application for a particular business scenario may require many business objects, where the structure of each has been determined based on the requirements of the particular business scenario.

Some application platforms include two or more deployment units, each of which is dedicated to particular business functions. For example, one deployment unit may provide financial functions, while another deployment unit may provide human resource functions. Each deployment unit may include several process components, each of which operates on several business objects. An application platform may allow developers to provide their own process components and/or business objects within a deployment unit.

The process components and business objects within a deployment unit may communicate with one another, but communication between deployment units is more difficult. If such communication is desired, a developer must manually create metadata entities to define this communication, and must manually implement corresponding process agent logic in code. Moreover, an appropriate runtime configuration for handling the communication must be manually established.

These manual tasks must comply with development guidelines of the application platform, and therefore require expensive developer training efforts and typically lead to long implementation times. Development errors are nevertheless likely to occur.

BRIEF DESCRIPTION OF THE DRAWINGS

FIG. 3 is a representation of business object metadata according to some embodiments.

FIGS. 4-17 comprise outward views of user interfaces according to some embodiments.

DETAILED DESCRIPTION

Figure 1:
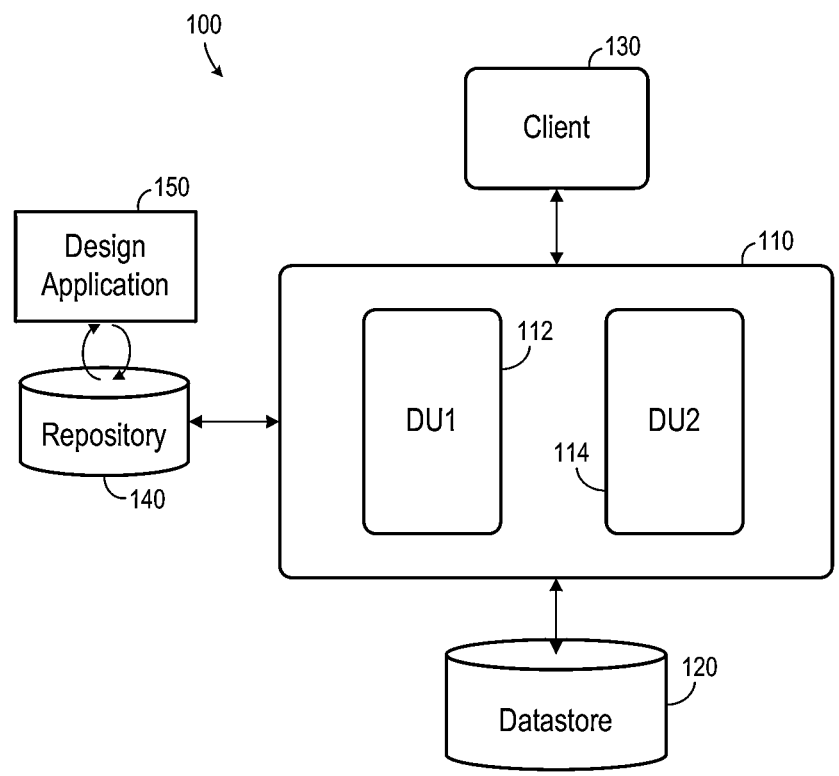
FIG. 1 is a block diagram of a system according to some embodiments.

FIG. 1 is a block diagram of system 100 according to some embodiments. System 100 includes application platform 110, datastore 120, client 130, metadata repository 140 and design application 150. Each of the illustrated components may be implemented by software and/or one or more hardware elements, with some software and/or hardware elements being shared among more than one illustrated component.

Application platform 110 may implement a service-oriented architecture, thereby providing services (i.e., business functionality) to service consumers. Such service consumers use this business functionality to provide user interfaces, application-to-application or business-to-business integration, output management (e.g., printing), spreadsheet download, etc. According to the illustrated embodiment, application platform includes two deployment units, but embodiments are not limited thereto.

Each of deployment units 112 and 114 includes several process components and associated business objects. The process components of a deployment unit operate in conjunction with the business objects of the deployment unit. While application platform 110 may ship to a customer with certain deployment units consisting of associated process components and business objects, a developer may code additional process components and/or define additional business objects in metadata for either of deployment units 112 and 114. However, the developer-coded process components of a deployment unit typically interact only with other process components (shipped or developer-created) and/or business objects (shipped or developer-created) located in a same deployment unit.

Each of deployment units 112 and 114 may be dedicated to particular business functions. In the example described below, deployment unit 112 is dedicated to customer invoicing and deployment unit 114 is dedicated to Human Capital Management.

Datastore 120 may comprise any one or more systems to store business data. Such systems include, but are not limited to, relational database systems, Online Analytical Processing (OLAP) database systems, data warehouses, application servers, and flat files.

Repository 140 stores metadata defining business objects and other logical structures used by application platform 110. A developer may modify and/or create metadata within repository 140 using design application 150. Application platform 110 may create and store runtime objects based on the metadata of repository 140.

FIG. 1 represents a logical architecture for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Figure 2:
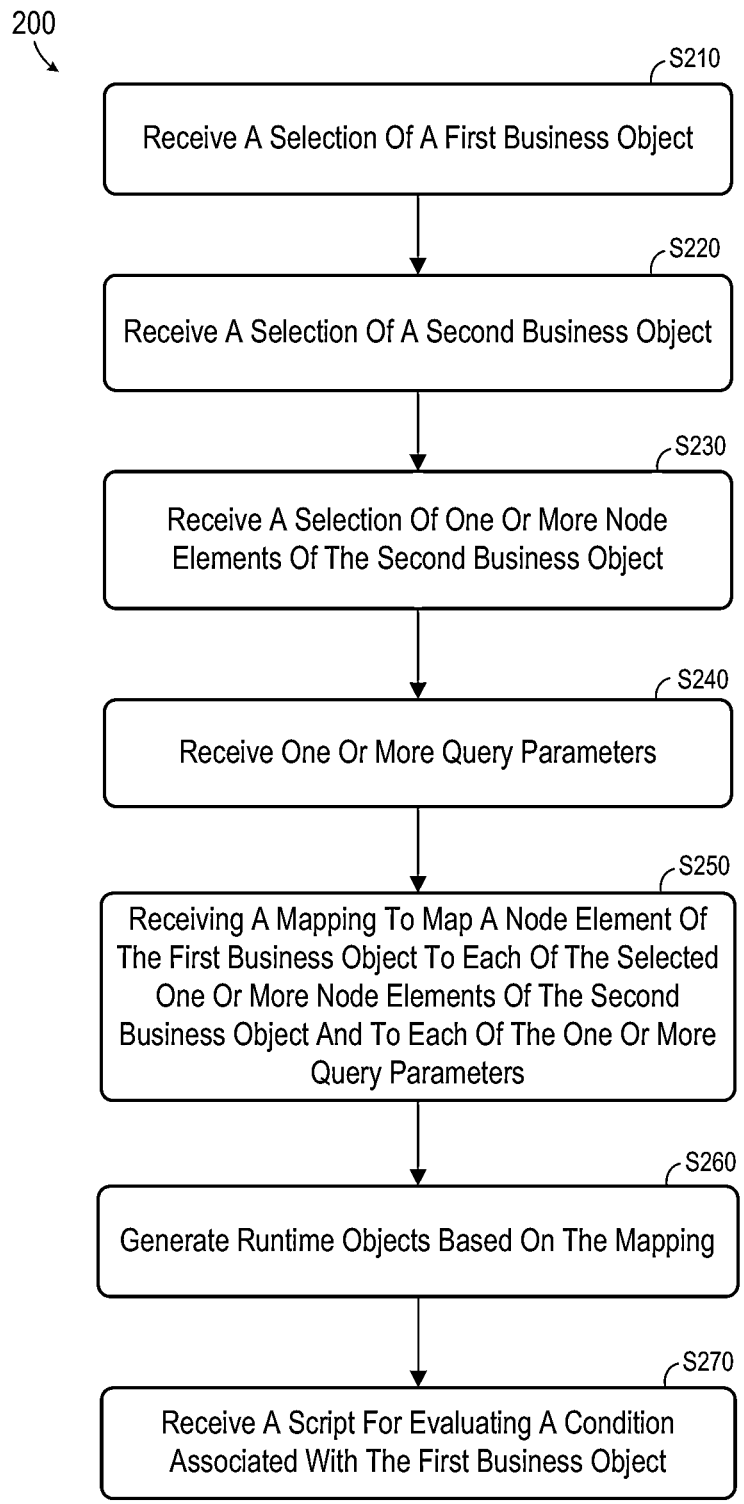
FIG. 2 is a flow diagram of process steps according to some embodiments.

FIG. 2 comprises flow diagram of process 200 according to some embodiments. In some embodiments, various hardware elements of an application platform execute program code to perform process 200.

All processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 will be described with respect to a particular use case. According to the use case, a developer has defined the business object BonusEntitlement in deployment unit 112, which is dedicated to customer invoicing. In order to pay an employee bonus defined by the BonusEntitlement business object, process 200 will be executed to establish an internal communication between the BonusEntitlement business object and an EmployeeCompensationAgreement business object of deployment unit 114, which is dedicated to human capital management. Embodiments are not limited to this particular use case.

Initially, at 5210, a selection of a first business object is received. The selected business object may be defined by metadata of repository 140, and may comprise a standard business object (e.g., SalesOrder) provided by the provider of application platform 110, or a business object created by a developer using design application 150 and represented within metadata of repository 140. FIG. 3 is a representation of metadata 300 defining the business object PDIBonusEntitlement, which will be considered in the present example.

Figure 4:
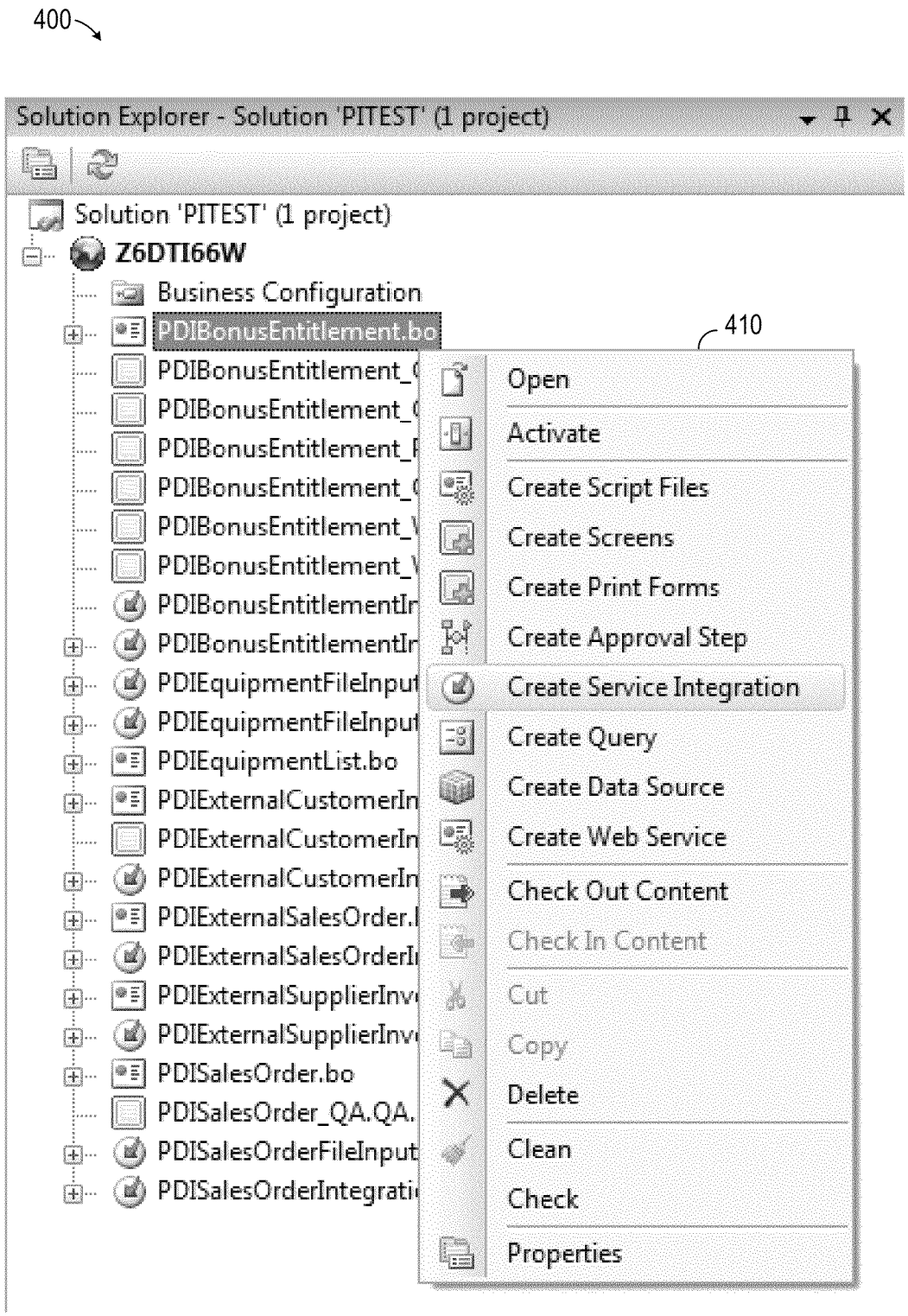
Figure 5:
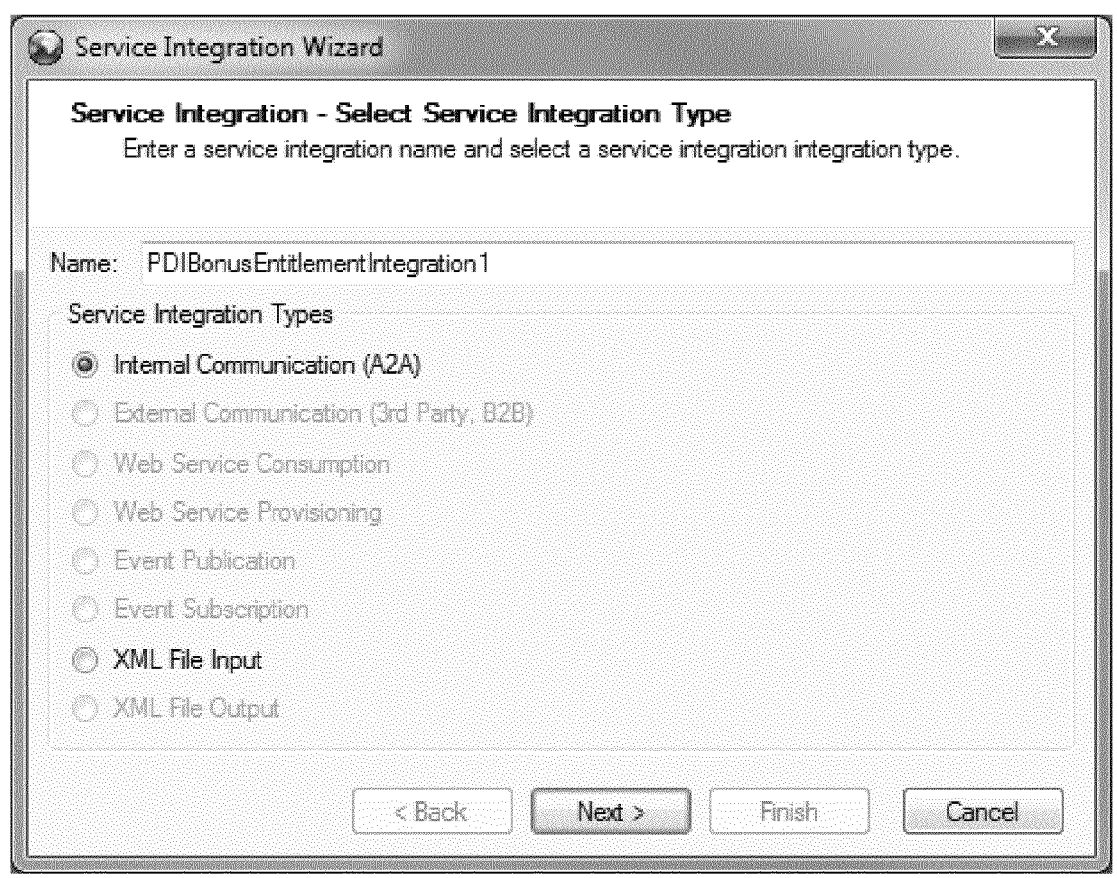

FIG. 4 illustrates interface 400 which may be used by a developer to select a business object at 5210 according to some embodiments. Interface 400 may comprise a window presented by a computing device executing program code of designer application 150. Interface 400 lists the business object PDIBonusEntitlement as "PDIBonusEntitlement.bo". In this regard, the business object PDIBonusEntitlement is currently active (i.e., usable) within system 100.

The text PDIBonusEntitlement.bo has been "right-clicked", resulting in display of context menu 410. The developer, according to the present example, then selects "Create Service Integration" from context menu 410. According to some embodiments, this selection causes designer application 150 to launch a service integration wizard, the interfaces of which are shown in FIGS. 5 through 11 and described below.

Figure 6:
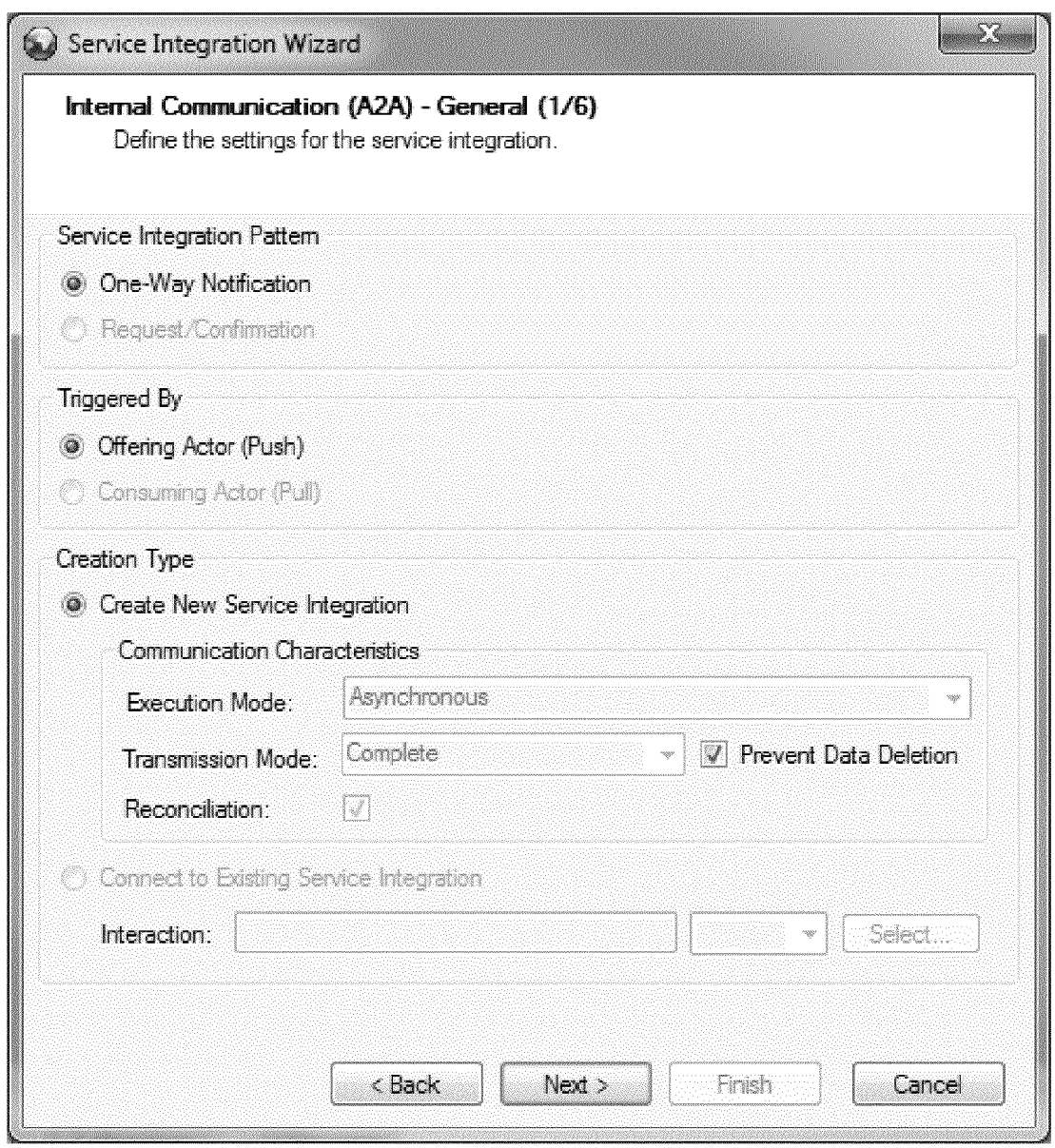
Figure 7:
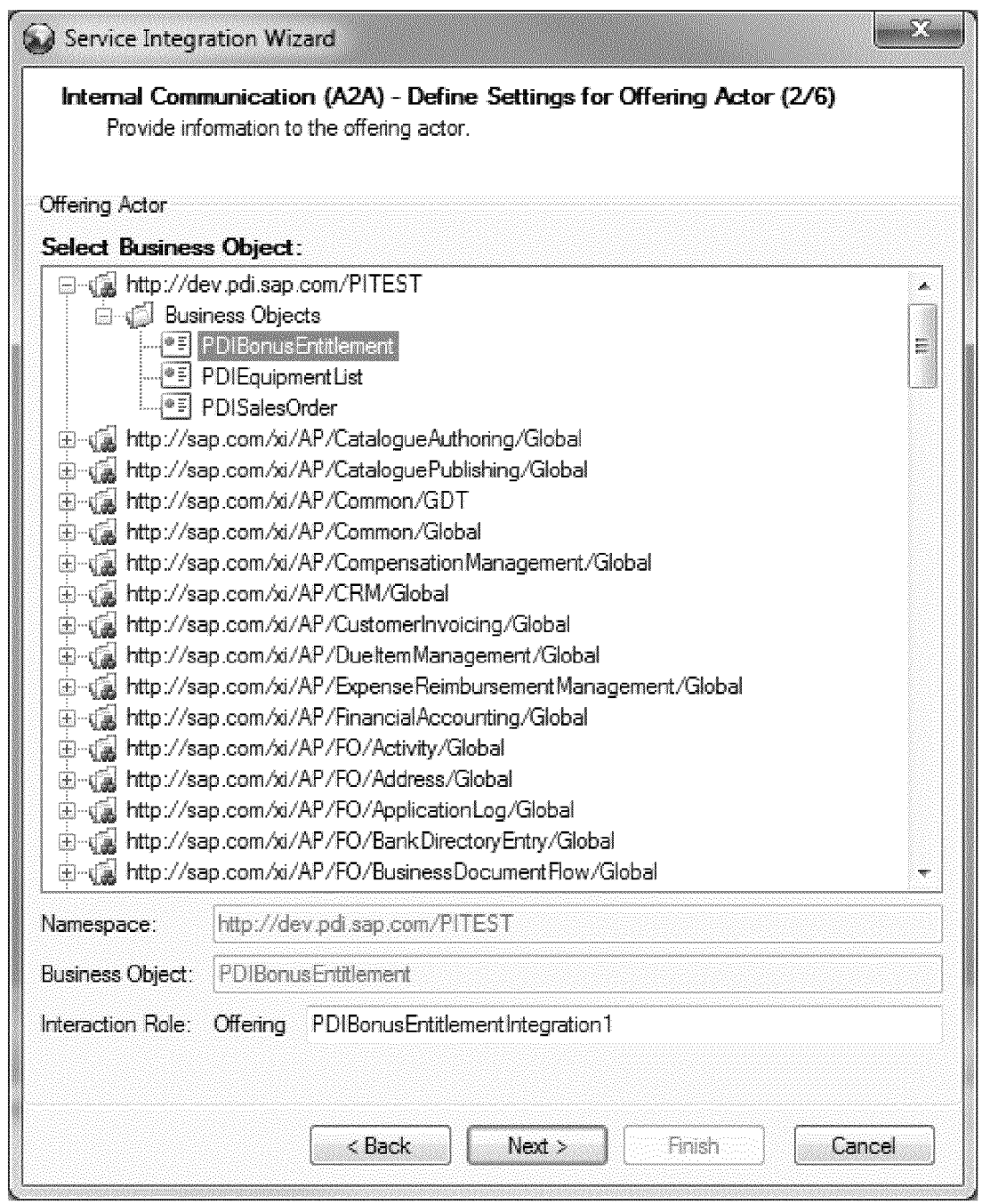
Figure 8:
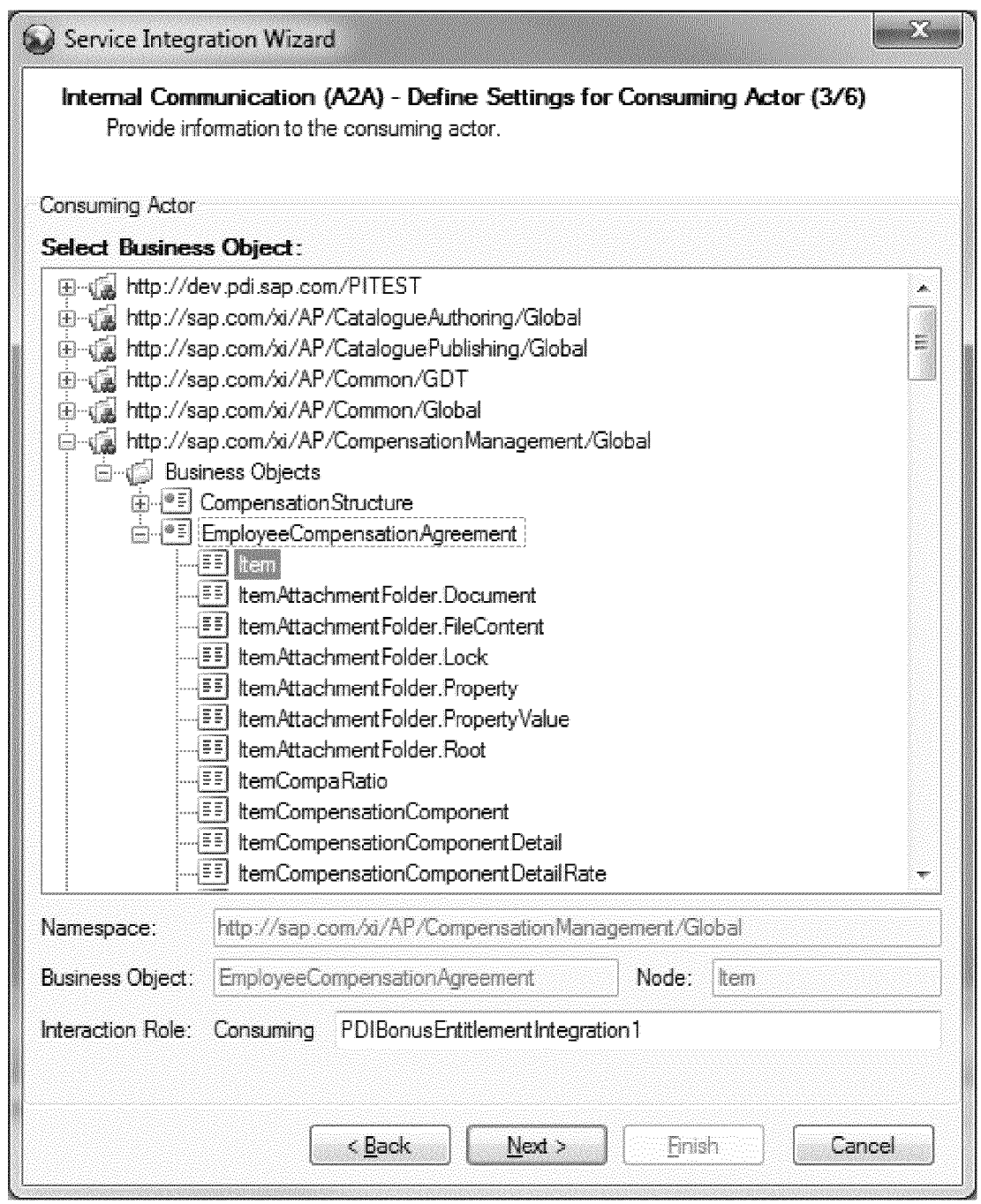

Initially, the developer enters "PDIBonusEntitlementIntegration1" into interface 500 to name the service integration to be modeled and indicates that the service integration represents internal communication (A2A). Interface 600 of FIG. 6 is presented upon selection of the Next button of interface 500.

Interface 600 allows the developer to specify some general information regarding the service integration. In the illustrated example, the developer has indicated that the service integration pattern is a one-way notification, the service integration is triggered by the offering actor (i.e., the business object PDIBonusEntitlement), and is a new service integration in which the communication (i.e., the message) is provided asynchronously and completely. A prevent data deletion checkbox is selected to indicate that data that is not in the message should not be deleted from the consuming business object and a reconciliation checkbox is selected to indicate support for an error resolution mechanism.

Interface 700 then presents all active and publicly-visible business objects of system 100, with the previously-selected business object PDIBonusEntitlement selected by default. The developer may alternatively select any other business object of interface 700 to be the offering actor at 5210 according to some embodiments. The developer assigns a unique name for the Offering interaction role, and selects the Next button to proceed to interface 800 of FIG. 8.

Interface 800 is used to receive a selection of a second business object at S220. Interface 800 refers to the second business object as the consuming actor. As shown, the developer has selected the business object EmployeeCompensationAgreement. Also selected in user interface 800 is a node of the selected business object, in this case the node Item. A unique name for the Consuming interaction role is entered (e.g., PDIBonusEntitlementIntegration1) and the Next button is selected.

Interface 900 of FIG. 9 provides selection of one or more node elements of the second business object (i.e., EmployeeCompensationAgreement) at S230. For example, the element CompensationComponentTypeID of the node ItemCompensationComponent is selected, as is the node element CompensationComponentAmount of the node ItemCompensationComponentDetailRate.

Also selected in interface 900 is an instance identification method (i.e., Query) and, accordingly, a query (i.e., QueryByElements). At S240 of process 200, query parameters EmployeeID and WorkAgreementCurrentlyActiveIndicator are selected. More than one sub-nodes and key fields thereof may also be selected in the subnode identification portion of interface 900.

Figure 10:
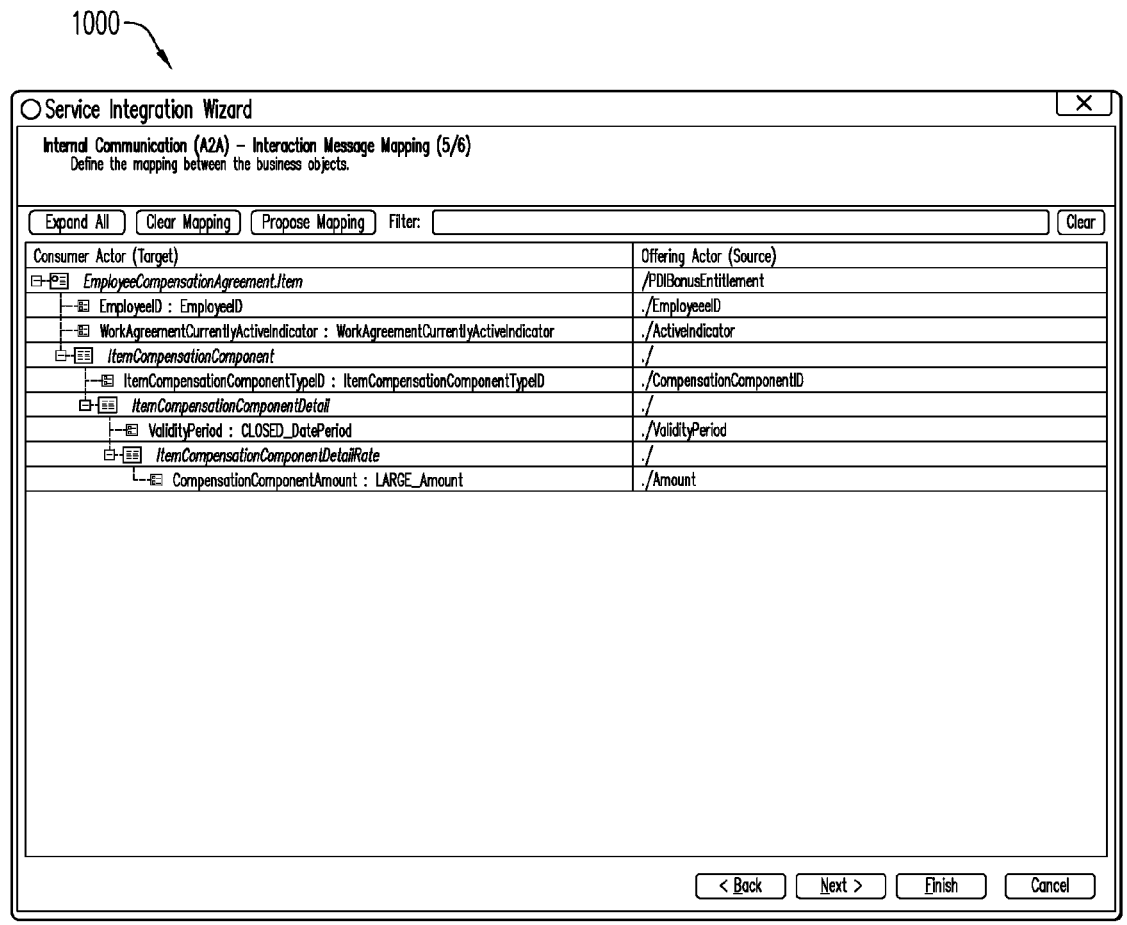

Interface 1000 of FIG. 10 allows the developer to specify mappings which are received at S250. As shown, a respective node element of the first (i.e., offering) business object is mapped to each of the selected node elements of the consuming business object. Moreover, a respective node element of the first (i.e., offering) business object is mapped to each of the one or more query parameters received via interface 900.

Figure 11:
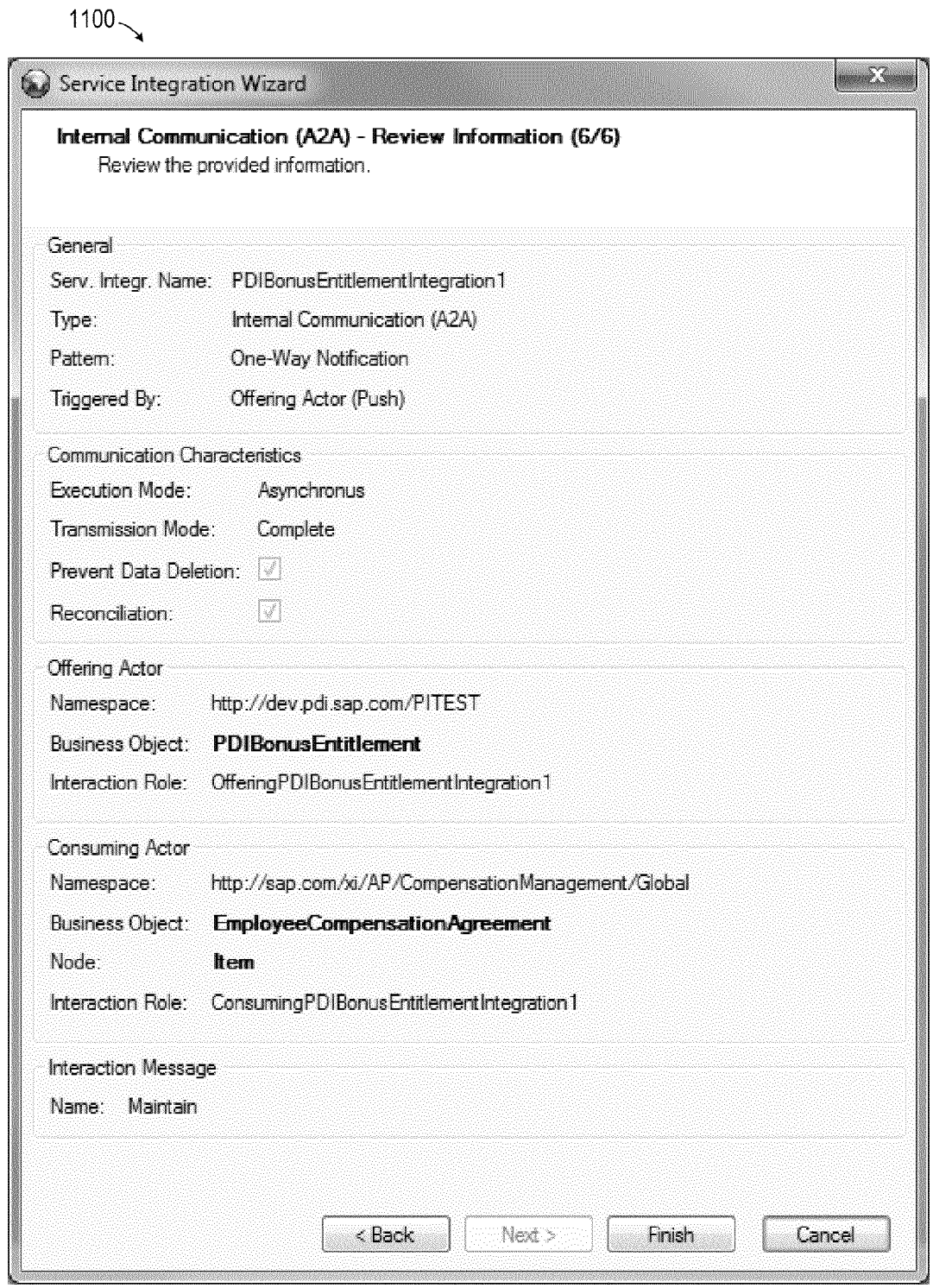

FIG. 11 illustrates interface 1100 for reviewing the information received via interfaces 500-1000. Interface 1100 provides a Back button for modifying the information, and a Finish button for saving the information and exiting the wizard.

Figure 12:
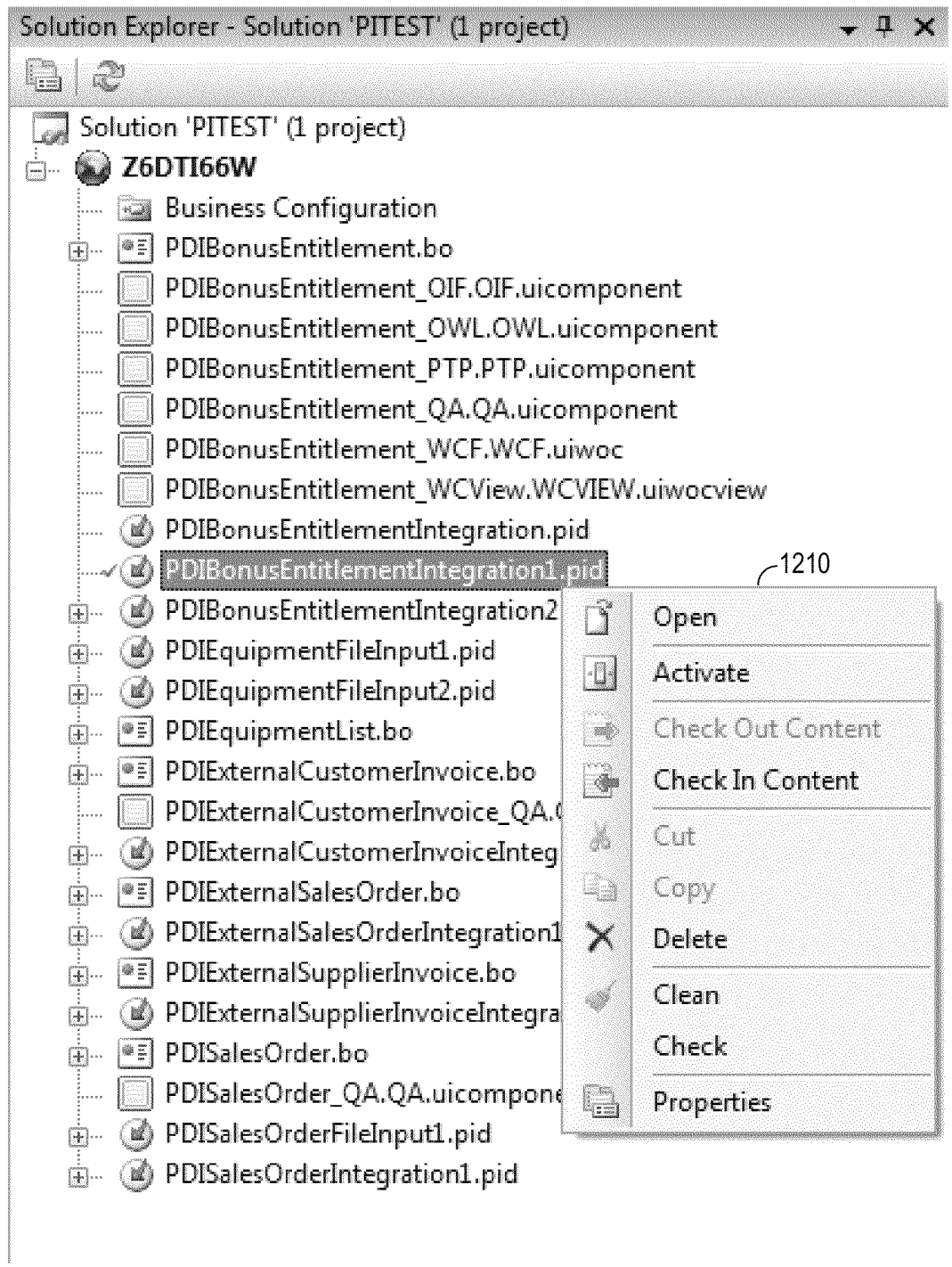

Continuing with the present example, as shown in FIG. 12, interface 400 now lists the newly-created service integration PDIBonusEntitlementIntegration1.pid. "PDIBonusEntitlementIntegration1.pid" is right-clicked and "Activate" is selected from subsequently-displayed context menu 1210 to generate runtime objects at S260 based on the mapping. The runtime objects are used at runtime to generate a message from the offering business object to the consuming business object. The runtime objects may be stored in datastore 120.

Figure 13:
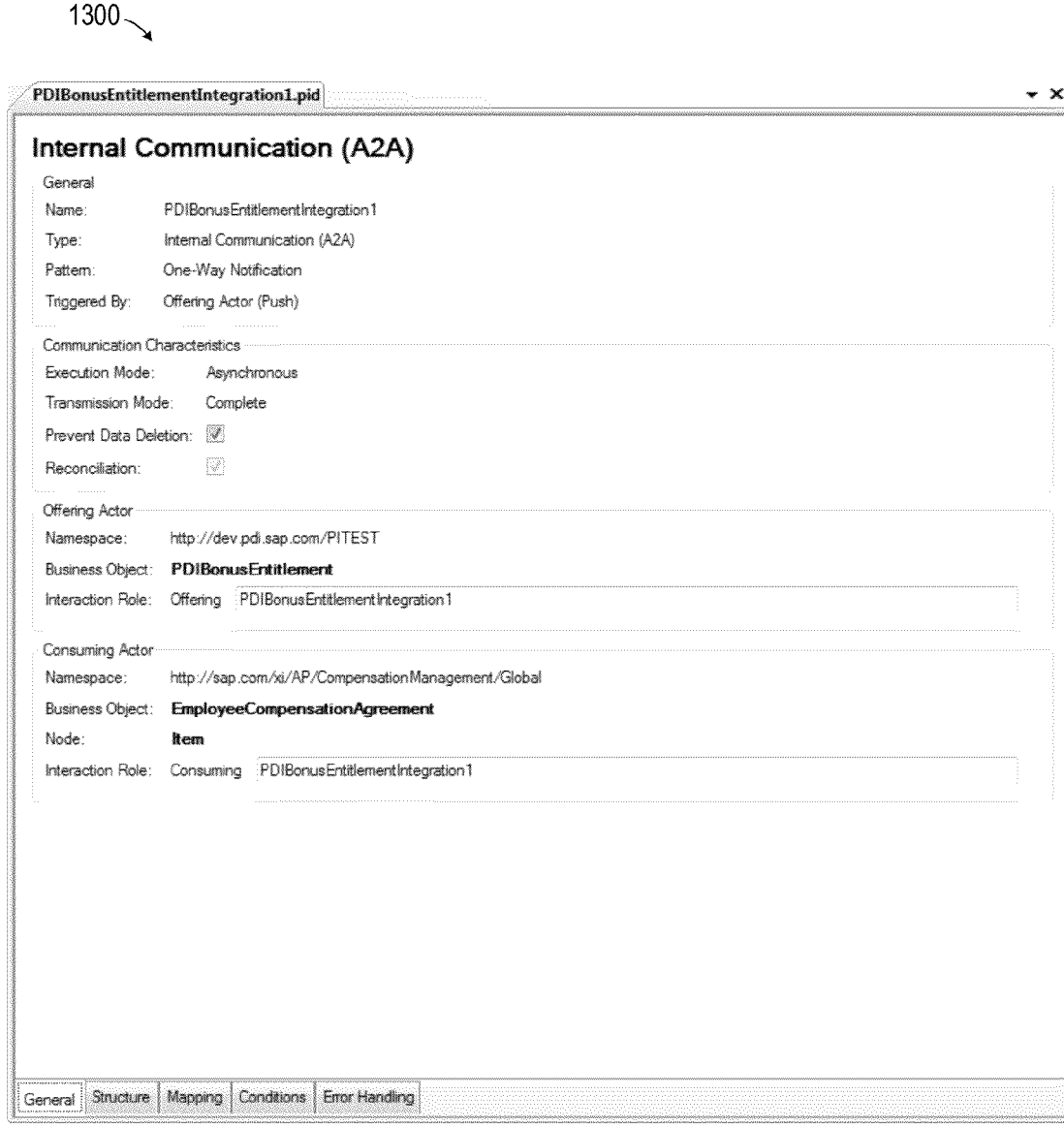
Figure 14:
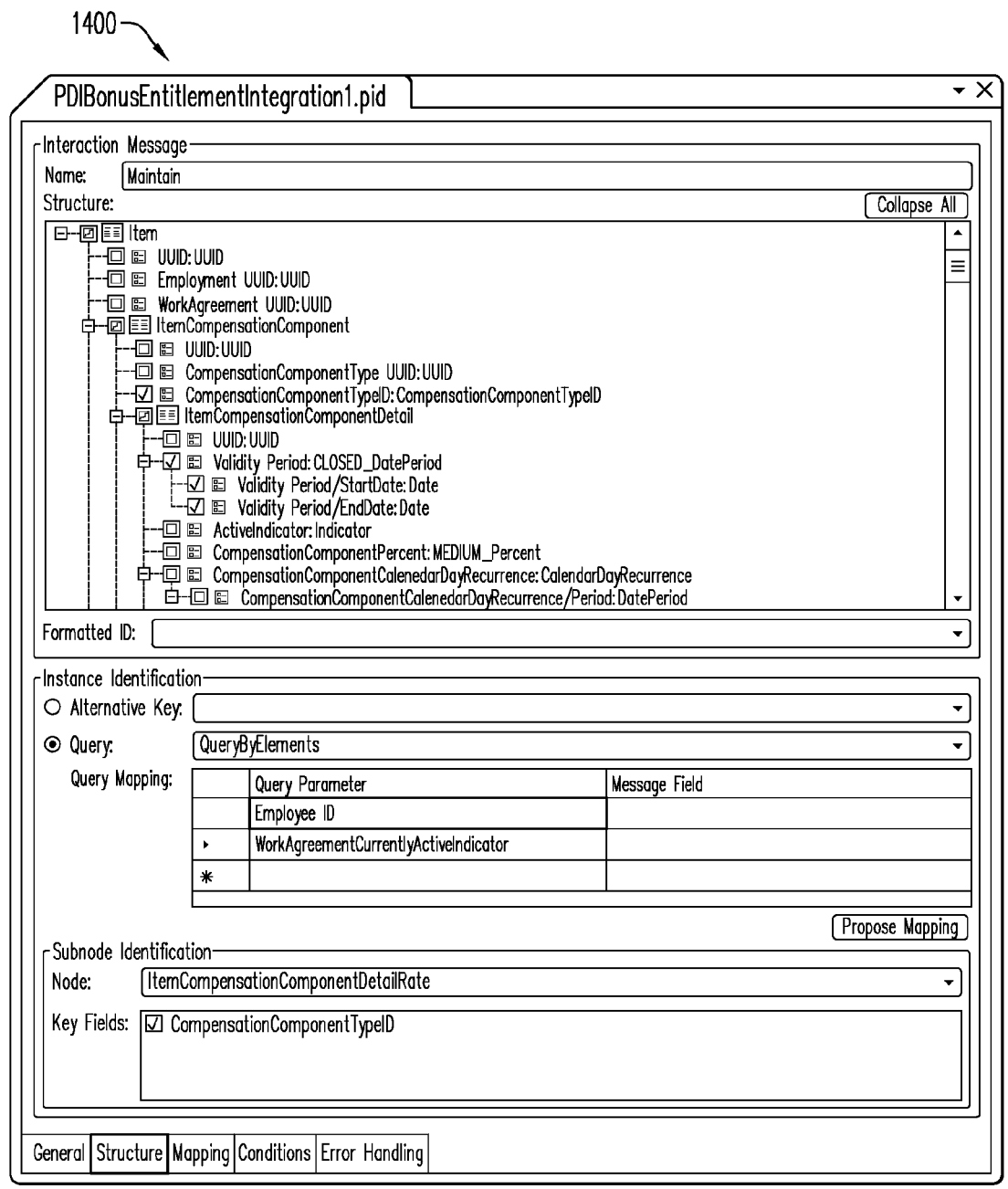
Figure 15:
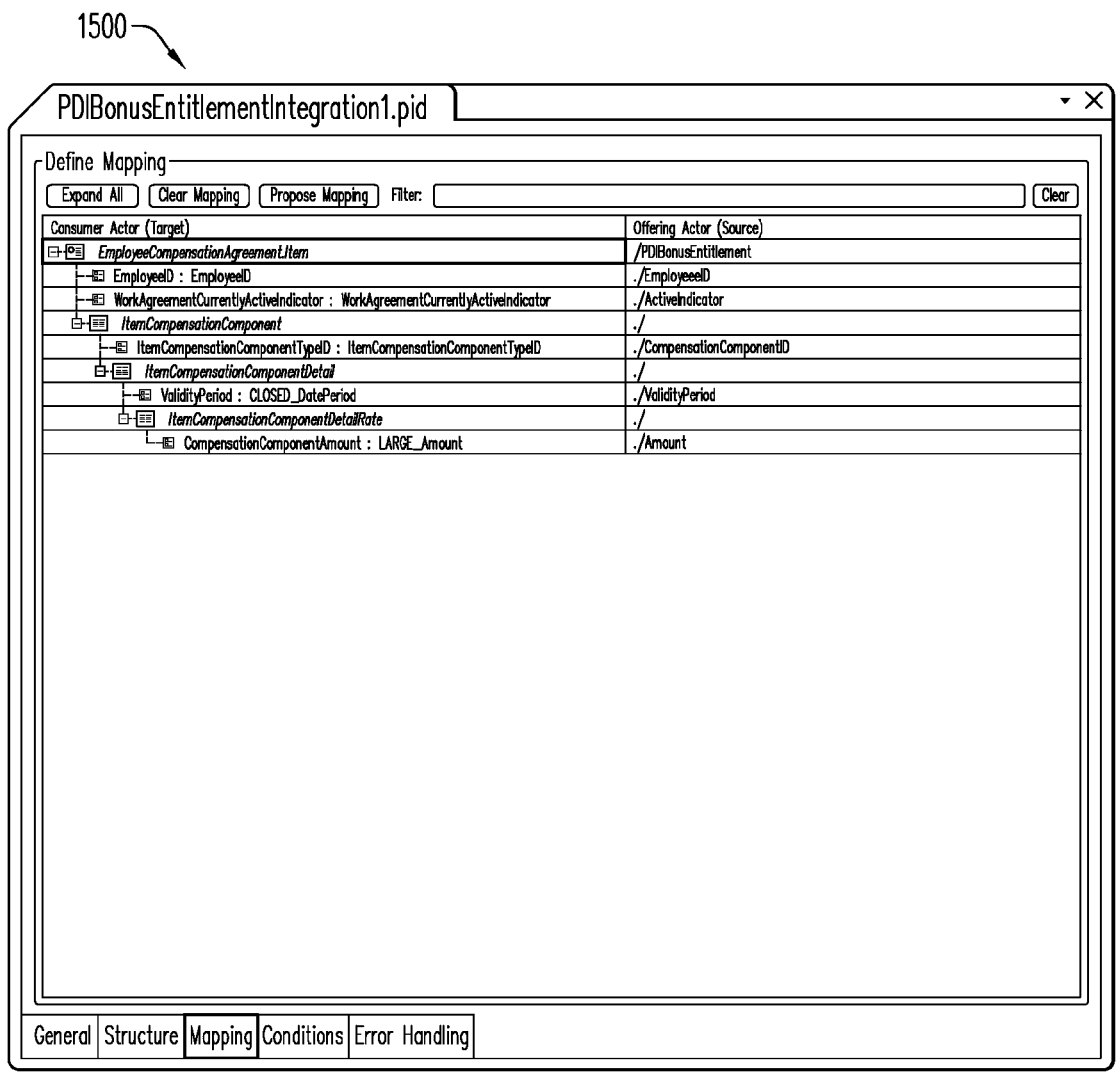
Figure 16:
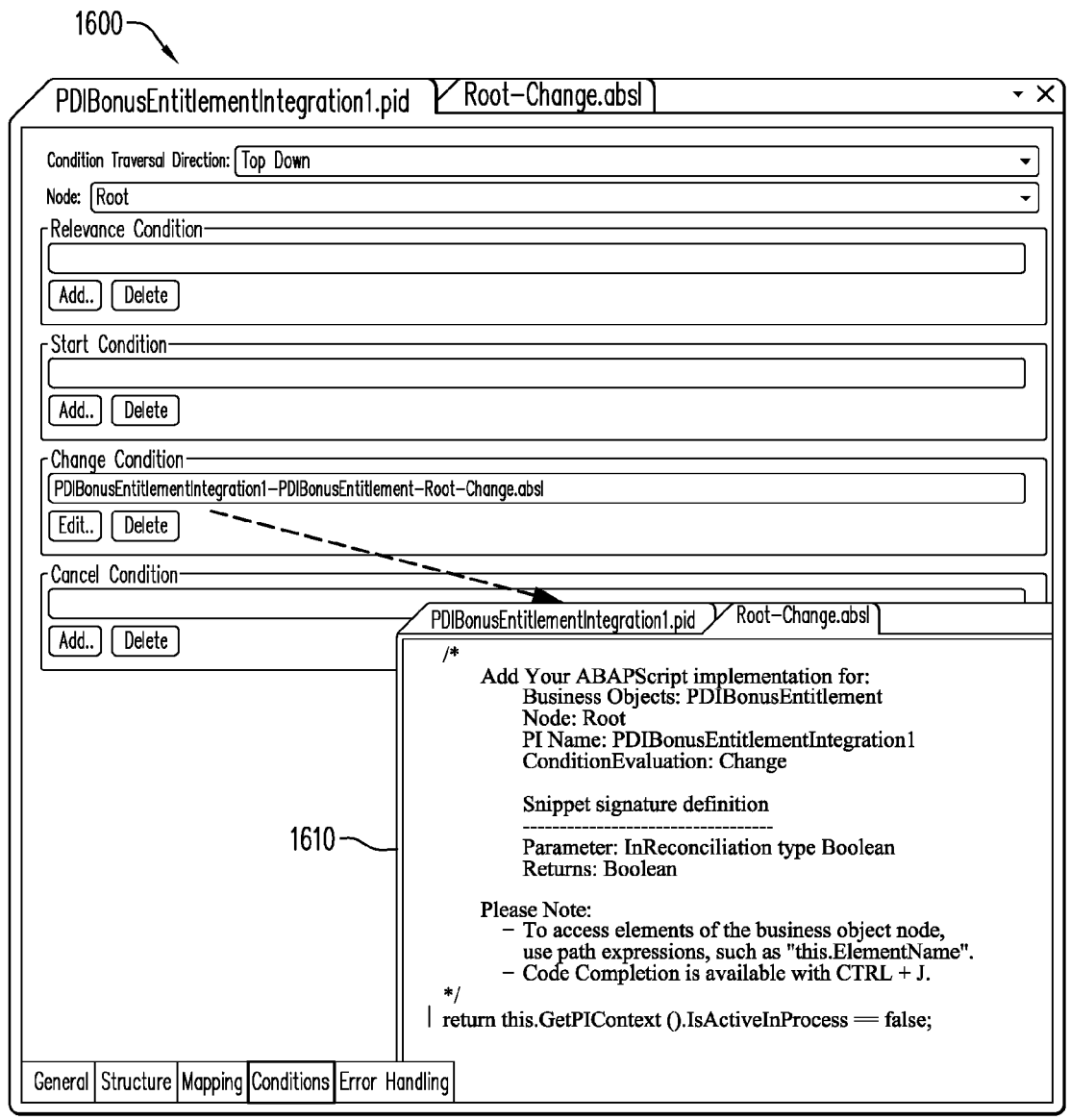

Designer application 150 may further provide interfaces 1300 through 1700 to review and redefine the internal communication definition. Interface 1300 of FIG. 13 is similar to above-described interface 1100 but allows renaming of the offering and consuming interaction roles. Interface 1400 of FIG. 14 is similar to interface 900 and allows review and revision of the selected node elements and the instance identification information, and interface 1500 of FIG. 15 allows review and revision of the mappings specified in interface 1000.

Interface 1600 is used to create scripts to evaluate conditions by which a message defined by the service integration will be sent. In this regard, interface 1600 may be used at S270 of process 200 to receive a script for evaluating a condition associated with the first business object. Scripts are optional according to some embodiments, which provide default logic for determining whether to send a message based on the service integration.

Selecting the Add button associated with any of the listed condition types allows creation of a script for evaluating a condition of the associated type. If a script has already been created for a particular type of condition, selection of the associated Edit button allows editing of the script in window 1610 as shown. Scripts may also be deleted using the corresponding Delete button.

According to some embodiments, a relevance condition defines when the service integration is relevant. A start condition defines when a message according to the service integration is first sent, and a change condition defines when a change message according to the service integration is sent. A cancel condition defines when a cancel message according to the service integration is sent.

To assist in evaluating conditions, business object nodes of some embodiments include an access method this.GetProcessContext( ), which includes the parameter InReconciliation for checking whether the process runs in reconciliation mode. The Process Context contains the following attributes (per condition/snippet type), where x indicates that the attribute/condition is available in the particular condition type, o indicates that the attribute/condition is available in the particular condition type, but only useful for ancestor nodes (default (true): same node/same condition type; default (false): same node/different condition type), and —indicates that the attribute/condition is not available in the particular condition type.

| Attribute/Condition | Description | Relevance | Start | Change | Cancel |
| --- | --- | --- | --- | --- | --- |
| IsActiveInProcess | Has BO node already been sent | — | x | x | x |
| IsCreated | Has BO node been created | x | x | x | x |
| IsUpdated | Has BO node been updated | x | x | x | x |
| IsDeleted | Has BO node been deleted | x | x | x | x |
| IsStarted | Has BO node been started in process | — | o (true) | o (false) | o (false) |
| IsChanged | Has BO node been changed in process | — | o (false) | o (true) | o (false) |
| IsCancelled | Has BO been cancelled in process | — | o (false) | o (false) | o (true) |

Figure 17:
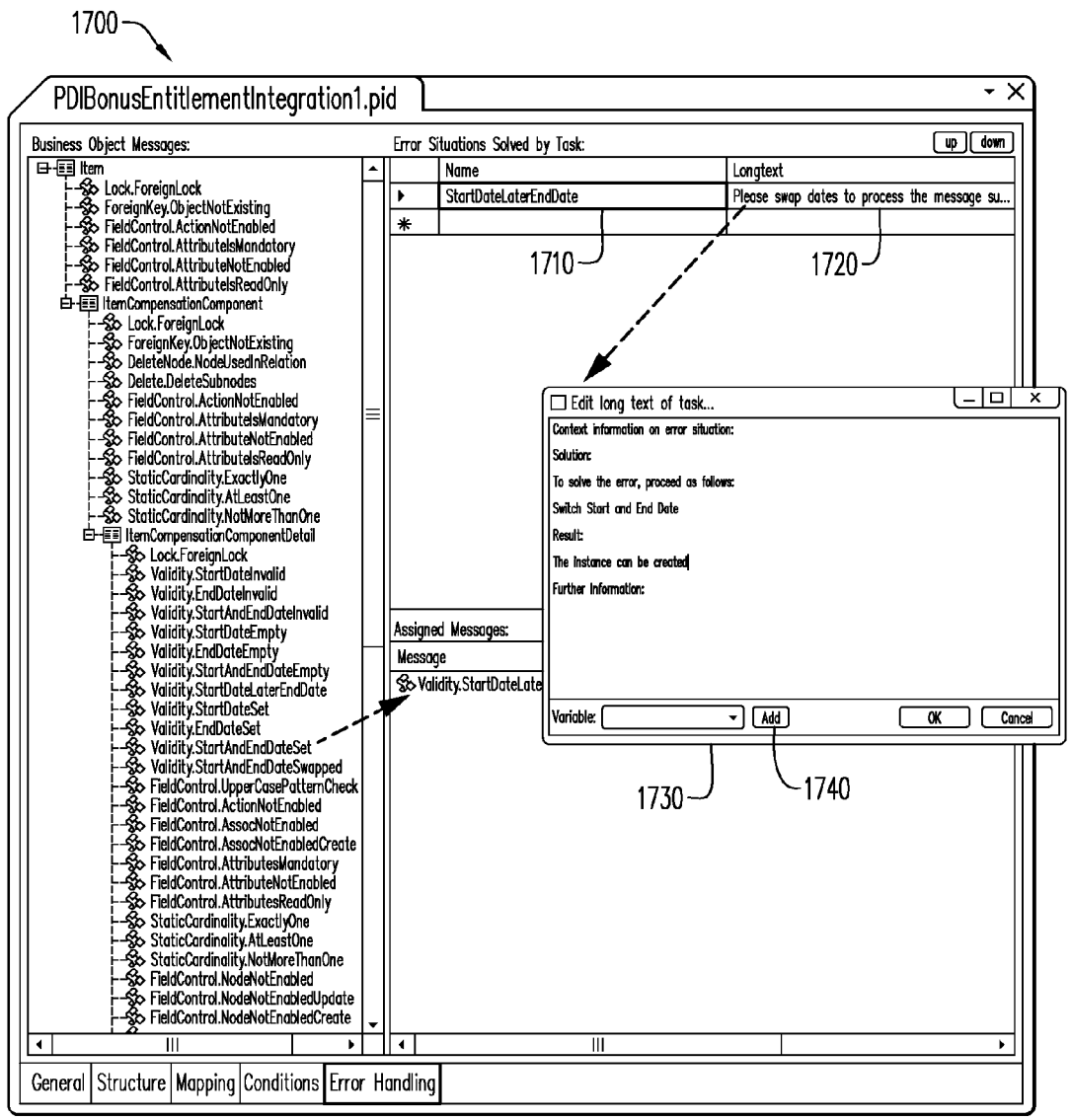

FIG. 17 illustrates interface 1700 to define error handling. According to the present example, the developer may enter a name for the error situation in name field 1610, and may drag any message associated with the selected business object into the Assigned Messages window of interface 1700. Selection of Longtext field 1720 results in display of interface 1730, into which the developer may enter text to describe the error situation. Interface 1730 also includes Add button 1740 for adding variables of the assigned business object message to the description, if available.

The mappings, scripts, error handling, and other information received during process 200 are stored in metadata of repository 140 as a service integration configuration, a mapping and one or more scripts.

Figure 18:
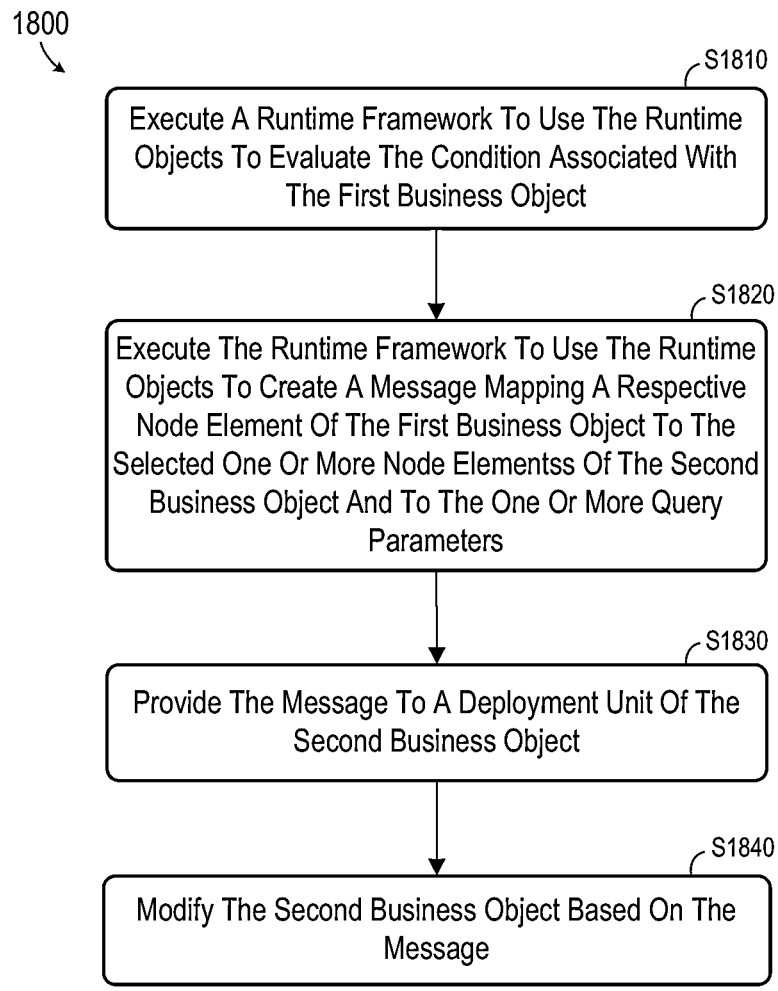
FIG. 18 is a flow diagram of process steps according to some embodiments.

Process 1800 of FIG. 18 relates to runtime operation of some embodiments. With reference to the description of process 200, a service integration runtime framework of application platform 110 executes at S1810 to use the runtime objects to evaluate the condition associated with the first business object. Continuing the present example, the service integration runtime framework may use the runtime objects to determine that a condition of the service integration which relates to the Amount element of the PDIBonusEntitlement business object has evaluated as TRUE.

Therefore, at S1820, the service integration runtime framework uses the runtime objects to create a message mapping a respective node element (e.g., as defined in interface 1000) to each of the selected one or more node elements of the second business object and to each of the one or more query parameters received at S240. The message is provided (asynchronously, as defined) to a deployment unit of the second business object at S1830, and the second business object (e.g., EmployeeCompensationAgreement) is modified based on the message at S1840.

According to some embodiments, process 200 may be executed to define another internal communication service integration associated with another two business objects. Runtime objects corresponding to such a service integration are generated at S260, and the same service integration runtime framework may be executed to use these runtime objects as described with respect to S1810 and S1830. Accordingly, some embodiments provide a modeling framework which automatically generates the required metadata and runtime objects required for service integration while leveraging a generic service integration framework so as to avoid the need for manual coding of process agent logic.

Figure 19:
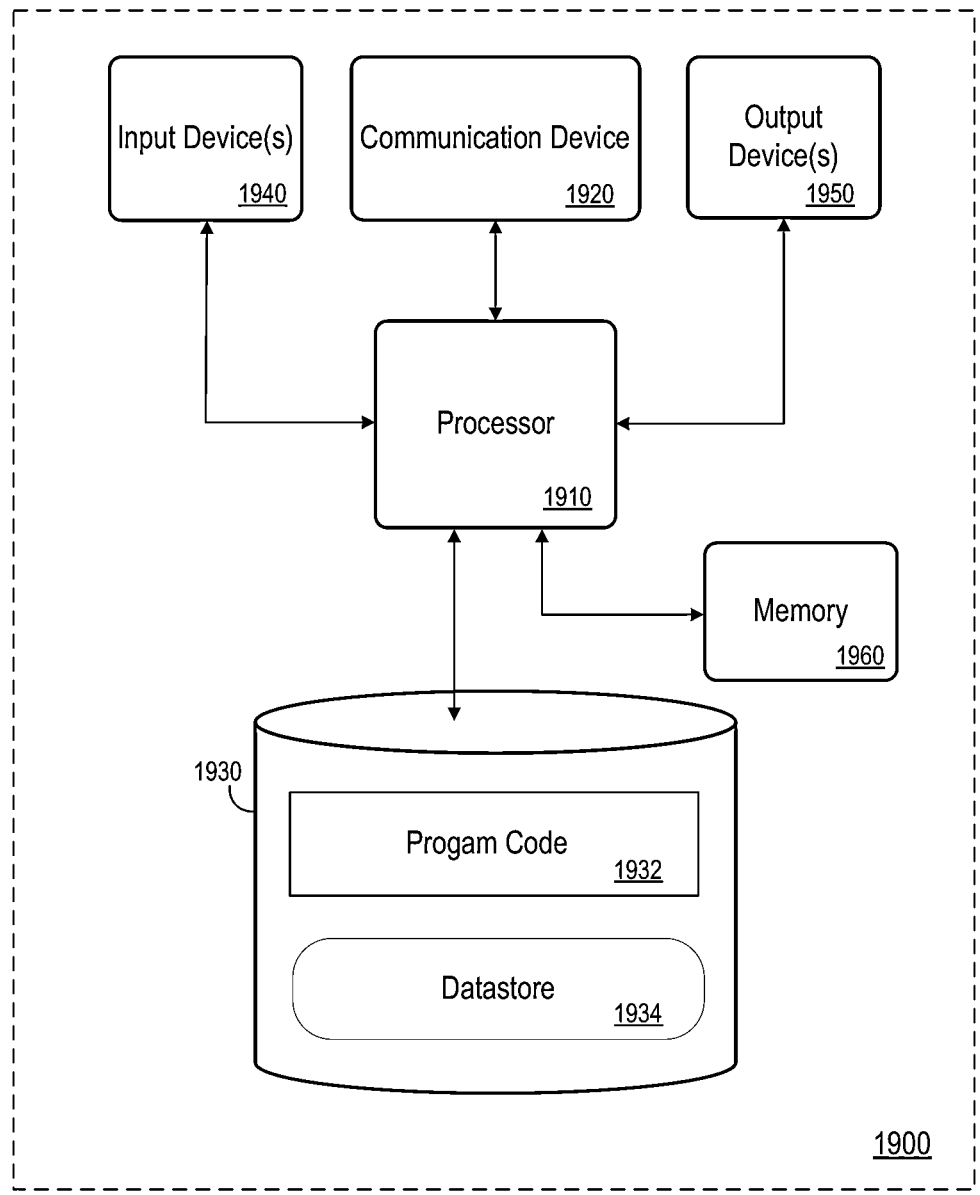
FIG. 19 is a block diagram of a computing system according to some embodiments.

FIG. 19 is a block diagram of apparatus 1900 according to some embodiments. Apparatus 1900 may comprise a general-purpose computing apparatus and may execute program code to perform any of the functions described herein. Apparatus 1900 may comprise an implementation of system 100. Apparatus 1900 may include other unshown elements according to some embodiments.

Apparatus 1900 includes processor 1910 operatively coupled to communication device 1920, data storage device 1930, one or more input devices 1940, one or more output devices 1950 and memory 1960. Communication device 1920 may facilitate communication with external devices, such as a reporting client, or a data storage device. Input device(s) 1940 may comprise, for example, a keyboard, a keypad, a mouse or other pointing device, a microphone, knob or a switch, an infra-red (IR) port, a docking station, and/or a touch screen. Input device(s) 1940 may be used, for example, to enter information into apparatus 1900. Output device(s) 1950 may comprise, for example, a display (e.g., a display screen) a speaker, and/or a printer.

Data storage device 1930 may comprise any appropriate persistent storage device, including combinations of magnetic storage devices (e.g., magnetic tape, hard disk drives and flash memory), optical storage devices, Read Only Memory (ROM) devices, etc., while memory 1960 may comprise Random Access Memory (RAM).

Program code 1932 may be executed by processor 1910 to cause apparatus 1900 to perform any one or more of the processes described herein. Embodiments are not limited to execution of these processes by a single apparatus. Datastore 1934 may store object instance data, runtime objects, and/or any other data described herein. Data storage device 1930 may also store data and other program code for providing additional functionality and/or which are necessary for operation thereof, such as device drivers, operating system files, etc.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A computer-implemented method comprising:
   receiving, via execution of program code by a processor, a user selection of a first business object, the first business object being a data structure component of a first deployment unit of an application platform, modeling a business process, and being defined by metadata to include one or more node elements;
   receiving, via execution of program code by the processor, a user selection of a second business object, the second business object being a data structure component of a second deployment unit of the application platform that is separate and distinct from the first deployment unit, modeling a business process, and being defined by metadata to include one or more node elements;
   receiving, via execution of program code by the processor, a selection made by the user of one or more of the node elements of the second business object;
   receiving, via execution of program code by the processor, one or more query parameters specified by the user;
   receiving, via execution of program code by the processor, a user specified mapping of a respective node element of the first business object to each of the selected one or more node elements of the second business object and to each of the one or more query parameters;
   receiving, via execution of program code by the processor, a script executable to evaluate a condition associated with the first business object;
   automatically generating, via execution of program code by the processor, runtime objects based on the mapping;
   executing, via execution of program code by the processor, a program to use the generated runtime objects and the script to evaluate the condition and to create a message mapping the respective node element of the first business object to each of the selected one or more node elements of the second business object and to each of the one or more query parameters;
   providing the message from the first business object of the first deployment unit to the second deployment unit including the second business object; and
   modifying the second business object based on the message.

2. A computer-implemented method according to claim 1, further comprising:
   receiving, via execution of program code by the processor, a selection made by a user of a third business object, the third business object relating to a business process and being defined by metadata to include one or more node elements;
   receiving, via execution of program code by the processor, a selection made by the user of a fourth business object, the fourth business object relating to a business process and being defined by metadata to include one or more node elements;
   receiving, via execution of program code by the processor, a selection made by the user of one or more of the node elements of the fourth business object;
   receiving, via execution of program code by the processor, a second one or more query parameters specified by the user;
   receiving, via execution of program code by the processor, a second mapping made by the user of a respective node element of the third business object to each of the selected one or more node elements of the fourth business object and to each of the second one or more query parameters;
   receiving, via execution of program code by the processor, a second script specified by the user and executable to evaluate a second condition associated with the third business object;
   generating second runtime objects based on the second mapping; and
   executing the program to use the second runtime objects and the second script to evaluate the second condition and to create a second message mapping the respective node element of the third business object to each of the selected one or more node elements of the fourth business object and to each of the second one or more query parameters.

3. A computer-implemented method according to claim 2, wherein the fourth business object are associated with a first deployment unit,
   wherein the third business object are associated with a second deployment unit, and the method further comprising:
   asynchronously providing, via execution of program code by the processor, the message to the second deployment unit;
   modifying, via execution of program code by the processor, the second business object based on the message;
   asynchronously providing, via execution of program code by the processor, the second message to the first deployment unit; and
   modifying, via execution of program code by the processor, the fourth business object based on the message.

4. A computer-implemented method according to claim 1, wherein the first business object is associated with a first deployment unit, and
   wherein the second business object is associated with a second deployment unit, the method further comprising:
   asynchronously providing, via execution of program code by the processor, the message to the second deployment unit; and
   modifying, via execution of program code by the processor, the second business object based on the message.

5. A non-transitory computer-readable medium storing program code executable by a computing system to cause a processor of the computing system to:

receive a selection made by a user and of a first business object, the first business object relating to a business process and being defined by metadata to include one or more node elements;

receive a selection made by the user of a second business object, the second business object being relating to a business process and defined by metadata to include one or more node elements;

receive a selection made by the user of one or more of the node elements of the second business object;

receive one or more query parameters specified by the user;

receive a mapping made by the user of a respective node element of the first business object to each of the selected one or more node elements of the second business object and to each of the one or more query parameters;

receive a script made by the user and executable to evaluate a condition associated with the first business object;

generate runtime objects based on the mapping; and execute a program to use the runtime objects and the script to evaluate the condition and to create a message mapping the respective node element of the first business object to each of the selected one or more node elements of the second business object and to each of the one or more query parameters.

6. A medium according to claim 5, the program code further causing the processor to:

receive a selection made by a user of a third business object, the third business object relating to a business process and being defined by metadata to include one or more node elements;

receive a selection made by the user of a fourth business object, the fourth business object relating to a business process and being defined by metadata to include one or more node elements;

receive a selection made by the user of one or more of the node elements of the fourth business object;

receive a second one or more query parameters specified by the user;

receive a second mapping made by the user of a respective node element of the third business object to each of the selected one or more node elements of the fourth business object and to each of the second one or more query parameters;

receive a second script specified by the user and executable to evaluate a second condition associated with the third business object;

generate second runtime objects based on the second mapping; and execute the program to use the second runtime objects and the second script to evaluate the second condition and to create a second message mapping the respective node element of the third business object to each of the selected one or more node elements of the fourth business object and to each of the second one or more query parameters.

7. A medium according to claim 6, wherein the first business object and the fourth business object are associated with a first deployment unit, wherein the second business object and the third business object are associated with a second deployment unit, and the program code further causes the processor to:

asynchronously provide the message to the second deployment unit;

modify the second business object based on the message;

asynchronously provide the second message to the first deployment unit; and modify the fourth business object based on the message.

8. A medium according to claim 5, wherein the first business object is associated with a first deployment unit, and wherein the second business object is associated with a second deployment unit, the program code further causes the processor to:

asynchronously provide the message to the second deployment unit; and modify the second business object based on the message.

9. A computing system comprising:

a memory storing processor-executable process steps; and a processor to execute the processor-executable process steps to cause the system to:

receive a selection made by a user of a first business object, the first business object being defined by metadata to include one or more node elements;

receive a selection made by the user of a second business object, the second business object being defined by metadata to include one or more node elements;

receive a selection made by the user of one or more of the node elements of the second business object from the user;

receive one or more query parameters specified by the user;

receive a mapping made by the user of a respective node element of the first business object to each of the selected one or more node elements of the second business object and to each of the one or more query parameters;

receive a script specified by the user and executable to evaluate a condition associated with the first business object;

generate runtime objects based on the mapping; and execute a program to use the runtime objects and the script to evaluate the condition and to create a message mapping the respective node element of the first business object to each of the selected one or more node elements of the second business object and to each of the one or more query parameters.

10. A system according to claim 9, the processor further to execute the processor-executable process steps to cause the system to:

receive a selection of a third business object from the user, the third business object relating to a business process and being defined by metadata to include one or more node elements;

receive a selection of a fourth business object from the user, the fourth business object relating to a business process and being defined by metadata to include one or more node elements;

receive a selection of one or more of the node elements of the fourth business object from the user;

receive a second one or more query parameters from the user;

receive a second mapping made by the user of a respective node element of the third business object to each of the selected one or more node elements of the fourth business object and to each of the second one or more query parameters;

receive a second script specified by the user and executable to evaluate a second condition associated with the third business object;

generate second runtime objects based on the second mapping; and execute the program to use the second runtime objects and the second script to evaluate the second condition and to create a second message mapping the respective node element of the third business object to each of the selected one or more node elements of the fourth business object and to each of the second one or more query parameters.

11. A system according to claim 10,
wherein the first business object and the fourth business object are associated with a first deployment unit,
wherein the second business object and the third business object are associated with a second deployment unit, and
the processor to further execute the processor-executable process steps to cause the system to:
asynchronously provide the message to the second deployment unit;
modify the second business object based on the message;
asynchronously provide the second message to the first deployment unit; and
modify the fourth business object based on the message.

12. A system according to claim 9,
wherein the first business object is associated with a first deployment unit, and
wherein the second business object is associated with a second deployment unit, the processor to further execute the processor-executable process steps to cause the system to:
asynchronously provide the message to the second deployment unit; and
modify the second business object based on the message.

* * * * *